United States Patent

[11] 3,601,711

| [72] | Inventor | David A. Richardson<br>Sheldonville, Mass. |
|---|---|---|
| [21] | Appl. No. | 630,321 |
| [22] | Filed | Apr. 12, 1967 |
| [45] | Patented | Aug. 24, 1971 |
| [73] | Assignee | The Foxboro Company<br>Foxboro, Mass. |

[54] MULTIPLE-CONTROLLER SYSTEM WITH IMPROVED AUTOMATIC-TO-MANUAL TRANSFER MEANS
10 Claims, 3 Drawing Figs.

| [52] | U.S. Cl. | 330/1 A,<br>330/24, 330/51 |
|---|---|---|
| [51] | Int. Cl. | H03f 1/00 |
| [50] | Field of Search | 328/146, 1;<br>330/51, 1 A |

[56] References Cited
UNITED STATES PATENTS

| 3,246,250 | 4/1966 | Nazareth, Jr. | 330/10 |
|---|---|---|---|
| 3,290,563 | 12/1966 | Hyer et al. | 317/231 |
| 2,956,234 | 10/1960 | Olsen | 330/10 |
| 3,197,711 | 7/1965 | Richardson | 330/103 |

*Primary Examiner*—Nathan Kaufman
*Attorney*—Bryan, Parmelee, Johnson & Bollinger

ABSTRACT: Industrial process control system wherein a plurality of individual electronic process controllers are provided responsive to respective process variables to produce corresponding output signals the largest one of which is automatically selected by a valve control station so as to determine the positioning of a process valve, the system including transfer means for switching from automatic operation to manual operation or vice versa without requiring any precedent balancing step and without upsetting the process.

INVENTOR
David A. Richardson

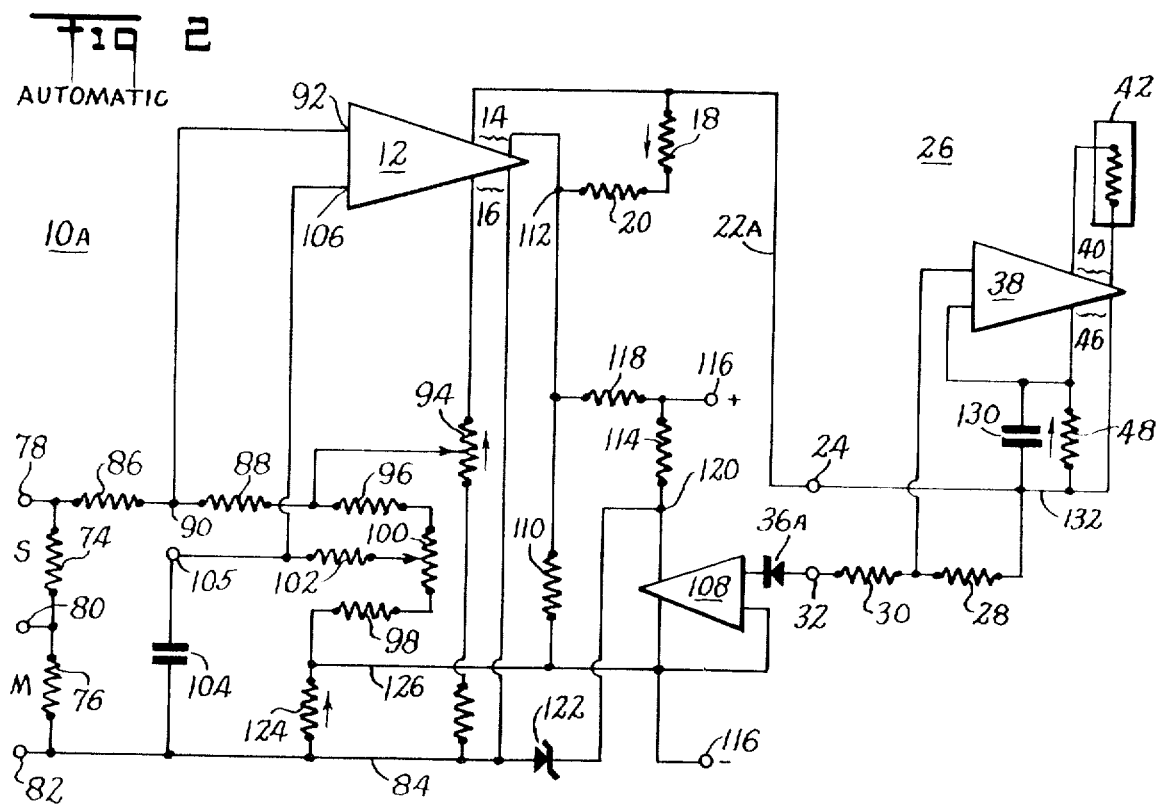
FIG. 2 AUTOMATIC
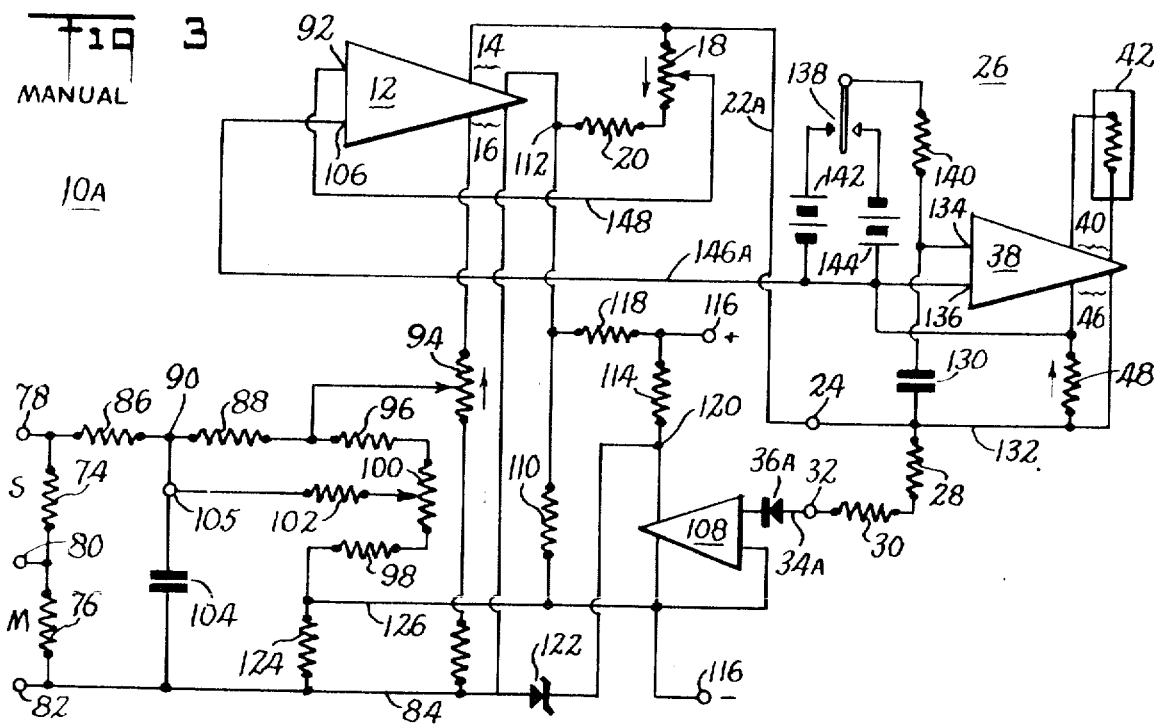
FIG. 3 MANUAL

MULTIPLE-CONTROLLER SYSTEM WITH IMPROVED AUTOMATIC-TO-MANUAL TRANSFER MEANS

This invention relates to industrial process control apparatus for maintaining constant a process condition such as temperature, flow rate, etc. More particularly, this invention relates to multiple-controller systems of the automatic selection type, i.e. systems wherein a single process condition is controllable by any one of a group of individual controllers, each responsive to a respective measured variable, and wherein means are provided for automatically selecting one controller from the group in accordance with predetermined criteria.

Various types of such multiple-controller systems have been used. One that has provided superior performance is the electronic control system disclosed in U.S. Pat. No. 3,197,711, issued to D. A. Richardson on July 27, 1965. As shown in FIG. 2 of that patent, the output currents of the individual controllers are coupled through respective diodes to a common load serving as the input circuit of a valve-operating station. With such diode coupling, the controller having the greatest output is automatically selected; that is, the input to the valve-operating station is determined solely by the controller producing the largest current.

The outputs of the nonselected controllers are made to "-track" that of the selected controller by means of special feedback circuits which automatically adjust the input signals to the nonselected controllers so as to provide output current matching that of the selected controller. Thus, the energy storage elements in the nonselected controllers (i.e. the elements providing dynamic effects such as reset action) are continuously maintained activated to a level adapted to assure a smooth transition in the event a nonselected controller subsequently is selected.

Virtually all process control systems require means for transferring from automatic to manual operation and vice versa. In earlier times, making such a transfer involved a rather complex procedure including a "balance" adjustment just prior to switchover. More recently, improved transfer switching arrangements have been developed for single-controller systems. For example, as disclosed in copending application Ser. No. 507,780, filed by D. A. Richardson et al. on Nov. 15, 1965, transferring in either direction between automatic and manual can be accomplished without any balancing step, and without disturbing the process. However, there remained the problem of providing suitable manual-to-automatic-transfer-switching means for systems of the multiple-controller type. The present invention solves this and related problems.

Accordingly, it is a principal object of this invention to provide an automatic-selection multiple-controller system with the facility of switching between automatic and manual operation without disturbing the process and without the need for a balancing step preceding switchover. Other objects, aspects and advantages of the invention will in part be pointed out in, and in part be apparent from the following description considered together with the accompanying drawings, in which:

FIG. 2 is a simplified circuit diagram showing the multiple-controller system in its automatic mode; and FIG. 3 is a simplified circuit diagram showing the multiple-controller system in its manual mode.

Figure 1:
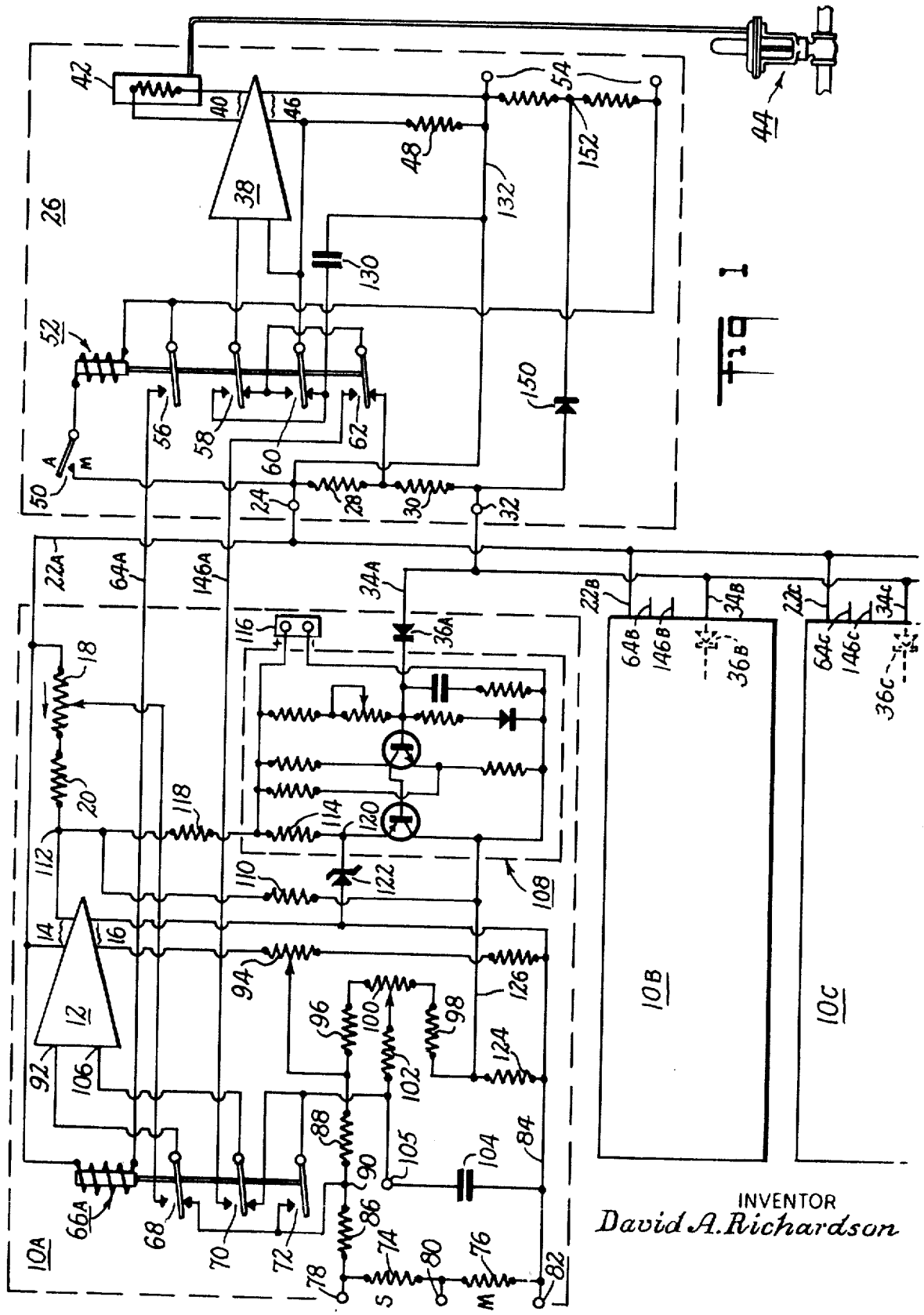
FIG. 1 is a circuit diagram illustrating a multiple-controller system embodying the present invention.

Referring now to FIG. 1, the control system includes two individual process controllers 10A and 10B. These controllers may be identical, and thus the operating elements of only one have been shown in order to simplify the presentation. Still further details of such a process controller are set forth in copending application Ser. No. 507,765, filed by D. A. Richardson et al. on Nov. 15, 1965. The system may comprise still further controllers as indicated at 10C, but the description hereinbelow will refer only to two controllers because that is sufficient to illustrate the principles of the present invention.

Each controller basically comprises a high-gain amplifier 12 having two separate output circuits 14 and 16 which are conductively isolated within the amplifier. The upper output circuit 14 supplies a current in the range of 10 to 50 milliamps to an output load comprising a potentiometer 18 (100 ohms) in series with a resistor 20 (500 ohms). The voltage developed across the output load serves as an output signal and is connected by an output lead 22A to an input terminal 24 of a valve-operating control station generally indicated at 26.

Within this control station 26, the controller output signals are applied together to a pair of series-connected resistors 28 and 30 (10K. and 50K. respectively). The return paths to the controllers are completed from the lower input terminal 32 through leads 34A, etc., connected to respective diodes 36A, etc.

The voltage developed across the first series resistor 28 is applied, through switching means to be described, to the input of a high-gain amplifier 38 essentially identical to amplifier 12 and serving as a valve-signal-generating means. One output circuit 40 of amplifier 38 provides current, in the range of 10 to 50 milliamps, to a load 42 which may be any conventional process valve operator, for example, a current-to-air transducer producing a corresponding pneumatic signal for a valve 44. The other output circuit 46 is conductively isolated from circuit 40 within the amplifier, and provides a linearly corresponding current to a feedback resistor 48.

The valve-operating control station 26 includes an automatic-to-manual transfer switch 50 adapted, when actuated to manual position, to energize a relay 52 from a DC power supply 54. This relay 52 in turn actuates a number of separate switch elements 56, 58, 60 and 62. The first switch element 56 connects power supply 54 to leads 64A, etc., to energize slave relays 66A, etc., at each of the controllers 10. These slave relays actuate further switches 68, 70 and 72 at the respective controller.

Before describing the automatic-to-manual transfer operation effected by switch 50, a brief review will first be presented of the operation of the system on automatic control. Referring now to FIG. 2, which is a simplified showing of the circuitry of one of the controllers 10A and the control station 26 when in "automatic" status, it will be seen that the controller includes two series-connected input resistors 74 and 76. These resistors are connected to input terminals 78, 80 and 82 adapted by known means (not shown herein) to supply to resistors 74 and 76 "set" and "measurement" input currents respectively representing the desired magnitude of a process variable and the measured value thereof. These currents flow in opposite directions and thereby produce between terminals 78 and 82 a so-called deviation signal indicating by its magnitude and polarity the extent and direction of the difference between the measured and the desired values of the process variable. The deviation signal may range between extremes of −4 volts to +4 volts, but generally will be considerably smaller.

As described in the above-identified copending application Ser. No. 507,765, this deviation signal is applied to an input network comprising a input reference lead 84 and a pair of series-connected resistors 86 and 88 (approximately 100K. each) which act as a voltage divider. The common point 90 between resistors 86 and 88 is connected to the upper input terminal 92 of the amplifier 12. The remote end of resistor 88 receives a negative feedback signal from a proportioning potentiometer 94 supplied with current from the lower amplifier output circuit 16, i.e. current corresponding linearly with that flowing in the upper output circuit 14.

The feedback signal on potentiometer 94 also is fed to a second voltage-dividing circuit comprising resistors 96 and 98 (each about 100K.) with an intermediate balancing potentiometer 100 of relatively low ohmic resistance. The tap of this potentiometer is connected through a reset resistor 102 (100 megohms) to a reset capacitor 104 (18 microfarads) and the lower input terminal 106 of the amplifier 12.

As explained in the above-identified copending application Ser. No. 507,765, a deviation signal of exactly zero results (after reset capacitor 104 is stabilized) in a zero-difference voltage between input terminals 92 and 106, and the amplifier 12 is adjusted to provide under these conditions a midrange output of 30 milliamps in output circuit 14. The introduction of a deviation signal causes a corresponding change (either up or down) in the amplifier output. In response to this change, negative feedback action through proportioning potentiometer 94 and resistor 88 initially tends to hold the difference voltage between the amplifier input terminals 92 and 106 to virtually zero, due to the very high gain of the amplifier which in the present embodiment is arranged to produce a full-range change in output for an input change of about 1 millivolt. If the deviation signal persists, the subsequent charging (or discharging) of the reset capacitor 104 tends slowly to augment the difference voltage at the input of amplifier 12 until ultimately the measured process variable is returned substantially to its set point.

Considering first the hypothetical case represented by FIG. 2 where only the single controller 10A is shown coupled to the control station 26, it will be evident that the input resistors 28 and 30 will receive an input current directly proportional to the controller output current flowing through load resistors 18 and 20. This input current returns to the controller through diode 36A, through the input circuit of an auxiliary amplifier 108, and through a bias resistor 110 (470 ohms) to the negative controller output terminal 112 at the left-hand end of the controller load resistor 20. Auxiliary amplifier 108 is sufficiently sensitive that an input current of only a few microamperes will cause it to conduct heavily through its load resistor 114. This amplifier is energized by a floating power supply 116 (20 volts) which also energizes bias resistor 110 through a dropping resistor 118 (4700 ohms).

The output terminal 120 of auxiliary amplifier 108 is connected through a Zener diode 122 (6.2 volts) and an auxiliary feedback output resistor 124 to the negative lead 126 of the power supply 116. With amplifier 108 conducting, the potential of its output terminal 120 will be very nearly the same as that of the negative power supply lead 126. Thus very little voltage is available to drive current through feedback resistor 124. With the Zener diode 122 providing a relatively high threshold level, no current actually will flow through feedback resistor 124 when amplifier 108 is energized through diode 36A as described hereinabove. Therefore, the operation of the controller feedback circuitry will be normal. That is, with zero voltage across the auxiliary feedback resistor 124, the controller will operate as described in the above-identified copending application Ser. No. 507,765.

Now, if the second controller 10B is connected to the control station 26 (i.e. in the manner shown in FIG. 1), and assuming further that its output signal is greater than that of the first controller 10A, the current flow through the input resistors 28 and 30 due to the second controller 10B will produce at the control station input terminal 32 a potential which is lower than if only controller 10A were connected to the control station. This lowered potential serves, in effect, to apply a reverse bias to the diode 36A, and thereby prevent conduction through that diode into the auxiliary amplifier 108, due to the well-known nonlinear diode conduction characteristics.

Thus, auxiliary amplifier 108 will be cut off, and the potential of its output terminal 120 will rise so as to permit conduction from the floating power supply 116 through the Zener diode 122 and the auxiliary feedback resistor 124. The resulting voltage drop across this resistor 124 will appear as an incremental change in the feedback signal applied to the lower input terminal 106 of amplifier 12. This change in feedback signal is in a direction to tend to increase the output of amplifier 12.

The resulting increase in the output current produced by amplifier 12 tends to reduce the potential at the negative controller output terminal 112, thus bringing the voltage across diode 36A towards and into conducting range. Slight conduction through this diode tends, in turn, to reduce the voltage across the auxiliary feedback resistor 124. The net result of these interacting feedback effects is that the output of amplifier 12 will be adjusted to a value such that the voltage drop across the output resistors 18 and 20 is just sufficient to produce a potential at negative output terminal 112 permitting a precisely determined amount of conduction through diode 36A. This amount of conduction results in a voltage across the feedback resistor 124 just sufficient to cause the output current of nonselected controller 10A to substantially match the output current of the selected controller 10B. When this condition has been established and the system stabilized, the voltage across auxiliary feedback resistor 124 will be essentially equal to the deviation signal developed by controller input resistors 74 and 76.

Thus the coupling circuitry between the controllers 10 and the control station 26 provides not only an automatic selection of that controller having the greater output current, but at the same time maintains the energy storage elements (reset capacitors, in the present embodiment) of the nonselected controllers activated at a level commensurate with the signal being sent to the valve by the selected controller. This latter relationship assures a smooth transition to a controlling function in the event the output of a nonselected controller subsequently exceeds that of the selected controller.

The voltage developed at the control station 26 across the input resistor 28 is opposed by the equal voltage developed across feedback resistor 48 by current flowing in the lower output circuit 46. Bridged across this feedback resistor is a memory element in the form of a capacitor 130 serving to "remember" the magnitude of the automatic valve control signal during switchover from automatic to manual operation, and adapted to assure that the valve control signal is held at the previous level immediately after switchover.

FIG. 3 shows the control system (simplified to include only a single controller) after having been switched to its "manual" mode. It will be seen that the memory capacitor 130 now is connected between the output reference lead 132 and the upper input terminal 134 of the amplifier 38 so that the normal feedback action of the amplifier will automatically hold the amplifier output at its level just preceding transfer to manual. That is, just before transfer capacitor 130 had been connected across the feedback resistor 48 so that the capacitor voltage was equal to the feedback voltage. After transfer to manual, the capacitor and feedback voltages are, in effect, connected together in series-opposition to the input of the amplifier. Since the feedback action tends to hold the difference voltage between the input terminals 134 and 136 at zero, it will be clear that the current through feedback resistor 48 will be maintained substantially at its original level in order to keep the amplifier input voltage zero immediately following switchover.

After transfer to manual mode, changes in the output current of the control station 26 can be effected manually by means of a three-position switch 138 which is operable to inject into the amplifier input circuit, through an input resistor 140, current of either polarity from DC power supplies 142 or 144. This current serves to charge (or discharge) the memory capacitor 130 to a new level. By feedback action, the amplifier output current will automatically adjust to the new charge level of the capacitor.

While on manual, it is desired to maintain the individual process controllers 10 constantly in condition to be returned to "automatic" mode without disturbing the process, and without requiring any balancing step preceding switchback to automatic. In the present embodiment, this result is accomplished in part by causing the output currents of all of the controllers to "track" the output current of the control station 26. To this end, the voltage developed by feedback resistor 48 is directed through feedback leads 146A, etc., to the lower input terminal 106 of each controller amplifier 12, while the upper input terminal 92 receives a feedback signal from the output circuit 14 over feedback lead 148. With this arrangement, the feedback action through lead 148 automatically holds the controller output current at a level corresponding to the valve signal developed by the control station 26. The feedback signal from lead 148 is adjustable in magnitude by potentiometer 18 to assure a direct and precise correspondence between the controller output and the manually set output of the control station.

With the outputs of both controllers 10A and 10B forced to follow the manual signal from control station 26, the output voltages of both controllers (i.e. in each case the voltage across load resistors 18 and 20) necessarily are equal. Thus the input resistors 28 and 30 of control station 26 are, in effect, energized by identical source voltages in parallel, so that the current through these input resistors will be essentially the same as though they were energized by only one of the two source voltages. Accordingly, the potential at the remote (low-potential) end 34A of resistor 30 will necessarily be such as to permit conduction through all diodes 36A, etc., into the corresponding auxiliary feedback amplifiers 108. This conduction, as explained hereinabove, will prevent the development of voltage across any of the auxiliary feedback resistors 124. Under these circumstances, the feedback signal to all of the controller reset circuits 102, 104 by the corresponding proportioning potentiometer 94 will correspond exactly to the manual signal being sent to the valve.

It should particularly be noted that while on manual operation, the circuit point 105 represented by the upper plate of the reset capacitor 104 is connected to the common point 90 between resistors 86 and 88, so that this capacitor is maintained charged to a level intermediate the voltages applied to the remote ends of resistors 86 and 88. These voltages consist of the deviation signal at one end and the feedback signal from the controller output circuit at the other end. As explained above, the current in this output circuit matches the manually set valve signal developed by the control station 26. Thus on manual operation the reset capacitor charge reflects both the deviation signal and the manually set valve signal being developed by the control station 26.

After switchback to "automatic" mode, the common point 90 between resistors 86 and 88 will be connected to the upper input terminal 92 of the amplifier 12, while the reset capacitor terminal 105 will be connected to the lower input terminal 106. Thus in automatic position the two amplifier input terminals are connected to respective circuit points which, while the system was in manual operation, were held at the same potential. It will be evident, therefore, that when the switchback to automatic operation takes place, the input voltage applied to amplifier 12 will initially be zero.

In the period immediately after switchback to automatic, there will not be any sudden large change in the controller output, because of the stabilizing effect of the reset capacitor 104 serving as a memory element. In more detail, the potential of the lower amplifier input terminal 106 relative to reference lead 84 is held virtually fixed because it is determined by the voltage of the reset capacitor 104 which cannot change rapidly. The other amplifier input terminal 92 will be held essentially at the same potential as input terminal 106 by feedback action through resistor 88. In order to hold terminal 92 at this potential by feedback action, the controller output signal must be equal to that previously existing on manual operation because it was such an output signal which on manual operation originally created that potential while capacitor 104 was connected to circuit point 90. Since on manual operation each controller output signal was forced to follow the manually set signal from control station 26, it follows that upon switchback to automatic all of the controllers initially will continue to produce an output signal of a magnitude to cause the control station to maintain the manually set valve control signal.

Of course, immediately upon switchback to automatic there will have to be a very slight change in potential at input terminal 92 in order to create an input signal different from zero (unless the controller output signal was 30 milliamps while on manual). This slight change in potential requires a corresponding change in the output current from that existing before switchback to automatic, but with the very high gain of amplifier 12, the amount of change in output required will be negligible.

At the instant of switchback to automatic mode, there typically will exist deviation signals at both controllers 10A and 10B (and at any others in the system), because the corresponding measured variables are unlikely to be exactly at the respective set point following an extended period on manual operation. Accordingly, the outputs of all of the controllers will immediately begin to change in response to the associated deviation signals. The direction of change will be determined essentially by the polarity of the deviation signal. The rate of change will depend upon the magnitude of the deviation signal, and also upon the RC time constant of the reset circuit. (In any event, the rate of change of the controller output signal usually will be relatively small because this change is limited by the rate at which the charge on the reset capacitor can be altered by current flowing through the reset resistor.)

Thus it will be evident that in the period immediately after switchback to automatic mode, the outputs of the several controllers will tend to change at different rates and possibly different directions, depending upon a number of actors, until a more stabilized automatic control condition obtains. In general, the controller producing the greatest output at any given instant will determine the valve signal developed by the control station 26 at that instant. However, the same controller will not necessarily dominate during the entire restabilizing period. For example, one controller with a relatively small deviation signal but a short reset time may initially determine the valve control signal, whereas another controller having a large deviation signal but a long reset time may subsequently take over control. In any event, regardless of the particular individual dynamic reactions involved, the system automatically provides for an integrated interplay of the various forces in such manner as to cause the process to be returned smoothly to properly regulated status.

When operating in automatic mode, it may be desirable to assure that the valve signal produced by control station 26 never falls below a predetermined level. For this purpose there is connected to the lower control station input terminal 32 (referring to FIG. 1) a diode 150 biased by an intermediate tap 152 of the power supply 54. With this arrangement, if the output signals of all of the controllers 10 drop below some preset value, conduction will occur through diode 150 to prevent the input signal to amplifier 38 from dropping below a level corresponding to the potential of power supply tap 152. This assures that the valve signal will never go below a corresponding predetermined magnitude.

Although the disclosed embodiment comprises individual controllers of the so-called reset-plus-proportioning type, other types of controllers also can be employed, depending upon the particular process application involved. For example, some or all of the controllers may include means to develop rate action, as disclosed in the above-identified copending application Ser. No. 507,765. It also is desired to emphasize that in general the disclosure of this application is intended only to illustrate the invention, it being recognized that various modifications and equivalents will occur to those skilled in the art, and accordingly the scope of the invention covered hereby is not to be considered limited except as required by the prior art.

I claim:

1. A process control system including a plurality of individual process controllers each comprising an amplifier with negative feedback means, each controller amplifier being responsive to a deviation signal reflecting the value of a respective process variable and arranged to produce a corresponding output signal; a control station including signal generating means responsive to a controller amplifier output signal for producing a corresponding control signal to be sent to a process operator such as a valve or the like; automatic selection means coupled to the outputs of all of said controller amplifiers and including means to direct to the input of said signal-generating means a signal representing the controller amplifier output signal which tends to be most extreme; first memory means for storing a signal representing the level of automatic control signal being sent by said control station to the process operator; a plurality of second memory means for said controllers respectively; switch means for transferring between automatic and manual operation, said switch means including:
1. first means operable in manual position for isolating said control station signal generating means from all of said controller amplifier output signals;
2. second means operable in manual position for coupling said first memory means to the input of said control station signal-generating means so as to maintain constant the signal being sent to the process operator in the period immediately after switchover to manual operation;
3. third means operable in manual position for directing to each of said second memory means signals representing both the corresponding deviation signal and the signal being sent to the process operator by said control station signal-generating means; and
4. fourth means operable upon transfer to automatic position for coupling each of said second memory means both to the input and to the negative feedback means of the corresponding controller amplifier so as to fix the output signal of each controller amplifier at a level causing said signal-generating means to continue to produce a control signal of the magnitude produced immediately before switchback to automatic.

2. A system as in claim 1, wherein said third switch means includes means to direct to the input of each controller a signal representing the manual signal being sent to the process operator; said third switch means further including means to couple the output of each controller to its input in opposition to the signal representing the manual signal, whereby feedback action automatically adjusts each controller output to a level corresponding to the manual signal.

3. A system as in claim 1, wherein said second memory means comprises a capacitor forming part of the negative feedback means of the corresponding controller to provide a reset effect in the controller output signal; said third switch means being operable in manual position to couple the deviation signal to said reset capacitor to energize the capacitor to a level such that, when said switch means is returned to automatic position, the capacitor voltage will in combination with the deviation signal provide a zero input signal to the controller amplifier.

4. A system as in claim 1, including an auxiliary amplifier for each of said controllers; means to supply to the inputs of each of said auxiliary amplifiers input signals corresponding to the magnitude of the selected controller output signal; individual detection means coupled to each of said auxiliary amplifiers respectively, said detection means being responsive to the difference between the selected controller output signal and the output signal of the corresponding controller; said detection means including means operable when said selected output exceeds the corresponding controller output to activate the associated auxiliary amplifier to develop an auxiliary feedback signal for the corresponding controller amplifier proportional to said difference and tending to increase said corresponding controller output signal, whereby to cause said corresponding controller output signal to match the selected output signal, and a Zener diode connected in series with the output of said auxiliary amplifier to prevent the development of any auxiliary feedback signal until a predetermined threshold is reached.

5. A system as in claim 1, wherein said controllers include means for introducing time-varying effects in the output signal, and second feedback means responsive to the selected controller output signal while said switch means is in automatic position, said second feedback means serving to adjust the inputs of the nonselected controllers so as to produce output signals substantially matching that of the selected controller.

6. A process control system comprising a plurality of individual process controllers each including a high-gain electronic amplifier with an input and negative feedback network, said input and negative feedback network including two circuit points normally connected respectively to the two input terminals of the corresponding amplifier; means to supply to the input of each controller amplifier a deviation signal reflecting the magnitude of a respective process variable so that the controller amplifiers will produce output signals corresponding to the process variables respectively; a control station comprising a high-gain electronic amplifier with a negative feedback circuit and serving as a signal-generating means for producing a control signal to be sent to a process operator such as a valve or the like; automatic signal selection means comprising a plurality of rectifying circuit elements each coupling the output signal of a corresponding one of said controllers to the input of said control station, said rectifying circuit elements serving to prevent the transmission to said control station of all of said controller amplifier output signals except the one having the most extreme magnitude, so that said control signal corresponds to the most extreme controller amplifier output signal; a first memory capacitor at said control station for storing a signal representing the level of said control signal as determined by a selected controller amplifier output signal; a plurality of second memory capacitors for said controllers respectively, each of said second memory capacitors forming part of said input and feedback network of the corresponding controller amplifier, the second memory capacitor being connected in each network in such a manner that when said two circuit points are connected together the second memory capacitor receives a charge reflecting the difference between the respective deviation signal and the feedback signal supplied to said network; and switch means for transferring between automatic and manual operation, said switch means including:
1. first means operable in automatic position for coupling said first memory capacitor to the output of said control station amplifier to place a charge on said capacitor corresponding to the control signal;
2. second means operable in manual position for isolating all of said controller output signals from the input to said control station amplifier;
3. third means operable upon switchover to manual position to couple said first memory capacitor to the input of said control station amplifier to produce a control signal equal to that previously produced in automatic condition;
4. fourth means operable in manual position for directing to said input and feedback network of each controller amplifier a feedback signal corresponding to the control signal being developed by said control station signal generating means;
5. fifth means at each of said controllers and operable in manual position for connecting together said two circuit points of said input and feedback network at the corresponding controller, thereby to charge said second memory capacitors to levels reflecting both the respective deviation signal and the control signal being produced by said control station; and
6. sixth means at each of said controllers and operable in automatic position for connecting said two circuit points of the corresponding input and feedback network to the two input terminals respectively of said controller amplifier.

7. A system as in claim 6, wherein at least one of said second memory capacitors forms part of the negative feedback means of the corresponding controller and is arranged to provide reset action in automatic control position.

8. A system as in claim 6, wherein said fourth means includes means activated in manual position to couple the output circuit of said control station amplifier to the inputs of said controller amplifiers to provide thereto a manually set signal; said fourth circuit means further including second negative feedback means for each of said controllers and activated in manual position to cause the corresponding controller output to match the manually set signal supplied from the output of said control station amplifier.

9. A system as in claim 8, including adjustment means for altering the amplitude of the feedback signal developed by said second feedback means, whereby to provide a precise match between the controller output signal and the manual control signal developed by said control station.

10. A system as in claim 6, wherein said controllers are arranged to provide an output current having a magnitude corresponding to the level of the signal to be sent to the process operator; a load resistance connected in each output circuit to provide a corresponding output voltage signal; a relatively high-resistance input resistor at said control station coupled to all of said load resistances to receive said output signals; a plurality of diode means for said controllers respectively to provide a return path for current flow from the input resistor of said control station back to the corresponding controller; and auxiliary amplifiers at each of said controllers having input circuits in said return path and arranged to produce auxiliary feedback signals for the corresponding controller when on automatic operation so as to maintain the output of a nonselected controller equal to that of a selected controller, said auxiliary amplifiers being arranged in manual condition to produce zero auxiliary feedback signal so that the level of charge on the associated second memory capacitor reflects only the deviation signal and the magnitude of the manually set control signal.